No. 612,735. Patented Oct. 18, 1898.
E. B. KILLEN.
AXLE FOR CYCLES OR LIKE VEHICLES.
(Application filed Jan. 4, 1898.)
(No Model.) 2 Sheets—Sheet 1.
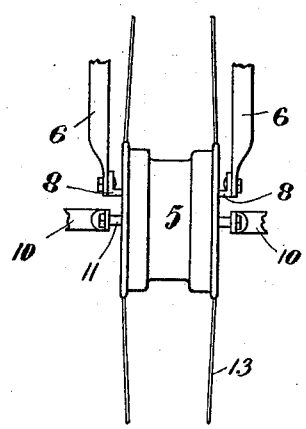
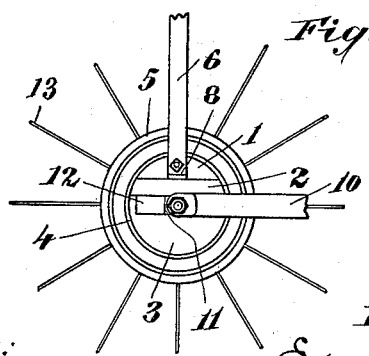

No. 612,735. Patented Oct. 18, 1898.
E. B. KILLEN.
AXLE FOR CYCLES OR LIKE VEHICLES.
(Application filed Jan. 4, 1898.)
(No Model.) 2 Sheets—Sheet 2.

Witnesses:
E. B. Bolton

Inventor:
Edward Brice Killen
By Richard
his Attorneys.

UNITED STATES PATENT OFFICE.

EDWARD BRICE KILLEN, OF BELFAST, IRELAND.

AXLE FOR CYCLES OR LIKE VEHICLES.

SPECIFICATION forming part of Letters Patent No. 612,735, dated October 18, 1898.

Application filed January 4, 1898. Serial No. 665,568. (No model.)

*To all whom it may concern:*

Be it known that I, EDWARD BRICE KILLEN, a subject of the Queen of Great Britain, and a resident of the city of Belfast, Ireland, have invented certain new and useful Improvements in Axles for Cycles or Like Vehicles, of which the following is a specification.

At present when constructing the frame of, say, a bicycle it is necessary, owing to the fact that the steering-wheel requires to be moved to the right or left when steering, to carry up the bottom bar of the frame to the steering-pillar and secure it at or near the crown of the steering-fork.

My invention has for its object to so make the axle of the steering-wheel and the parts connected therewith that the present diamond or other frame may be extended from the bottom bracket to the axle of the steering-wheel, so as to give a much stronger frame than at present. It is well known that at present the weakest part of a bicycle-frame is at the crown of the fork.

In carrying out my invention I make the axle of the steering-wheel of a diameter, by preference, equal to the length of the hub. The axle is preferably made in three pieces which are inclosed within a ring of metal and held in place therein by means of a central pin or pivot or in other equivalent manner. The hub runs on ball-bearings on the aforesaid ring. Secured rigidly between the upper and middle portions of the axle is a fork or its equivalent, to which the lower ends or prongs of the steering-fork of the cycle are secured. Between the middle and lower portions of the axle a cross-bar is fitted in such a manner that the axle is capable of turning on it and about the central pin or pivot. This cross-bar projects out laterally at each side of the axle, and two stays or a fork extending horizontally or at an incline from the bottom bracket of the cycle-frame are or is secured to it.

Figure 2:
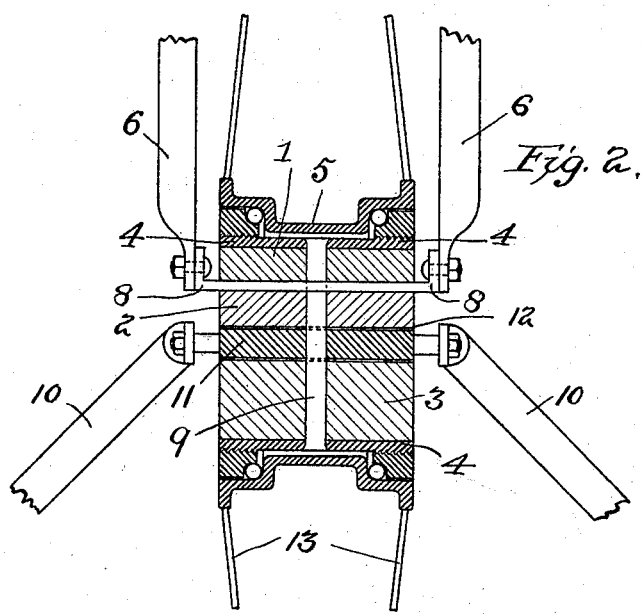
Figure 4:
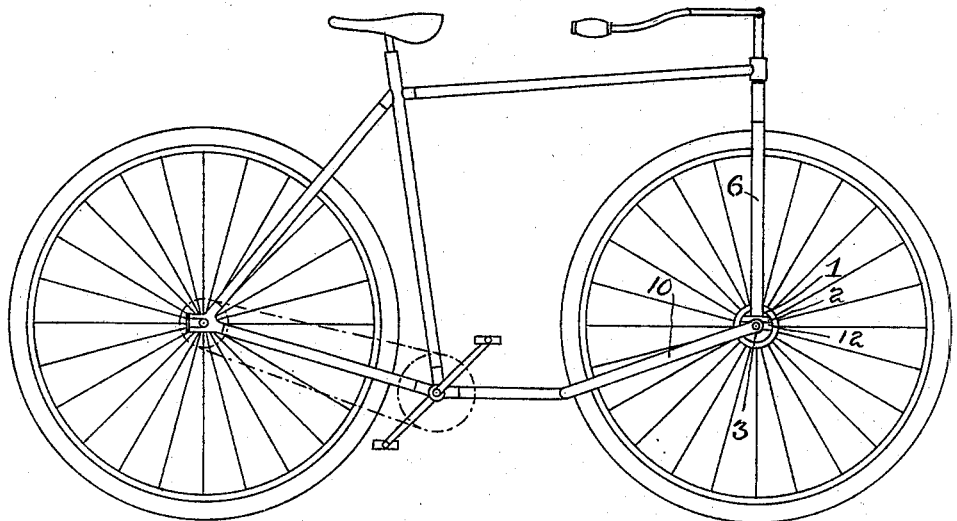

Figure 1 is a front view, Fig. 2 is a section, and Fig. 3 is a side view, of the axle and hub of the steering-wheel of a cycle. Fig. 4 shows a complete machine in side elevation with my improvements attached.

In carrying out my invention I make the axle of the steering-wheel of a diameter by preference equal to the length of the hub. The axle is made of wood or other suitable material and of three separate parts 1 2 3, with a pivot-pin 9 down through the center. The three parts are inclosed within a shell or ring 4 of metal, and upon this shell the hub 5 of the steering-wheel runs, as usual upon ball-bearings. The parts 6 6 of the steering-fork of the machine are connected rigidly together by a cross-bar 8, through which the pivot-pin 9 passes. The parts 10 10 of the additional lower fork extending from the bottom bracket of the frame are connected together by a strong cross-bar 11, through which the pivot-pin 9 passes.

12 is a slot made in the axle and extending across it from side to side. The arrangement is such that when the steering-fork of the machine is turned the bar 8 is turned, and as a consequence the steering-wheel and its axle are caused to turn to one side or the other, as the case may be. The amount of movement, say, up to forty-five degrees is limited by the slot 12. It will thus be seen that the steering-fork and front wheel can be easily turned to guide the machine without affecting the position of the cross-bar and the additional stays or fork of the frame.

The axle may be made of wood or metal, and if metal is used aluminium or other light metal would preferably be employed.

The invention is applicable to cycles, cycle-cabs, and the like.

Having now fully described my invention, what I claim, and desire to secure by Letters Patent, is—

1. In combination with the steering-fork 6 of a cycle, the steering-wheel having its hub connected to the fork to turn laterally therewith, the said hub being slotted and the frame part extending into the slot and having a pivot to engage the hub, substantially as described.

2. In combination, the forks 6, the cross-piece 8 thereon, the steering-wheel hub through which the said cross-piece extends, the said hub being slotted, the frame part extending into the said slot and the pivot-pin 9 extending through the hub, the cross-piece and the frame part.

3. In combination, the shell 4, the pieces 1, 2, 3, the pivot-pin 9, the cross-bar 8, the cross-bar 11, the steering-fork, the lower additional fork of the frame, and the hub of the wheel running upon the shell, substantially as hereinbefore set forth.

Signed at Belfast, Ireland, this 13th day of December, A. D. 1897.

EDWARD BRICE KILLEN.

Witnesses:
 THOS. HILLIS,
 JOSEPH GLANCY.